FIG-3

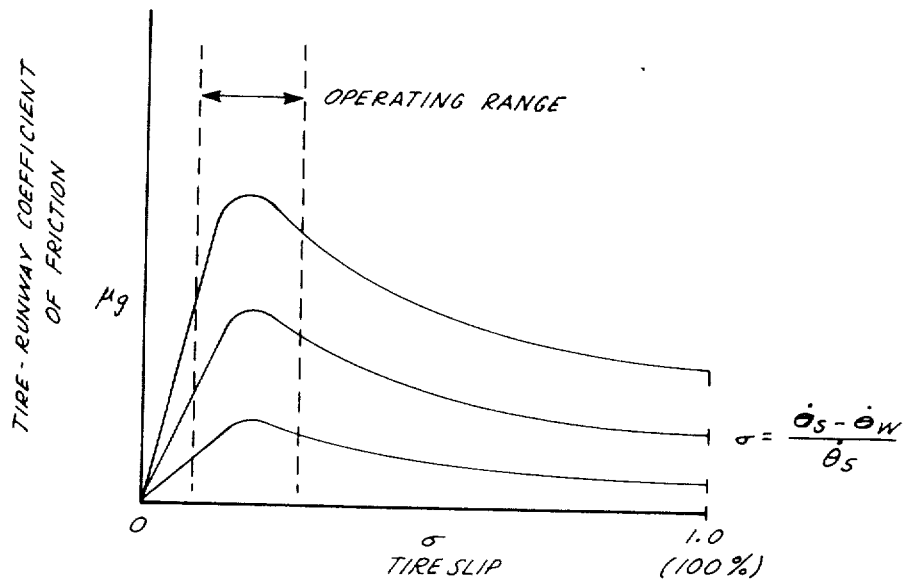
FIG_1
TIRE - RUNWAY CHARACTERISTICS
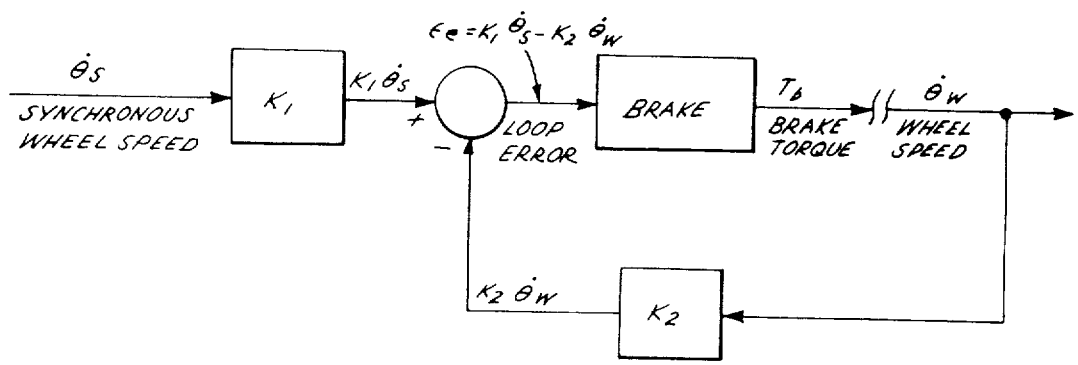
FIG_2
SIMPLIFIED SKID CONTROL LOOP
INVENTOR.
ORLAND D. BRANSON
BY
ATTORNEY

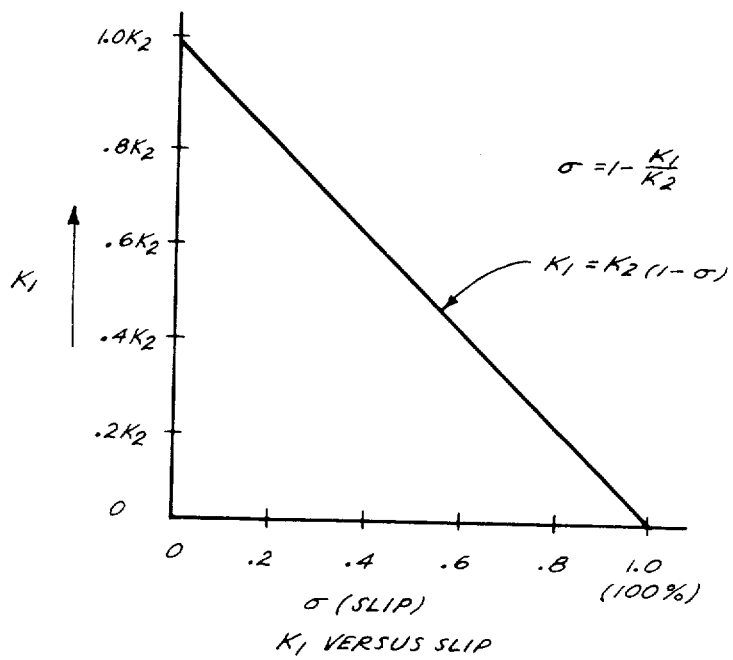

$$\sigma = 1 - \frac{K_1}{K_2}$$

$$K_1 = K_2(1-\sigma)$$

$K_1$ VERSUS SLIP

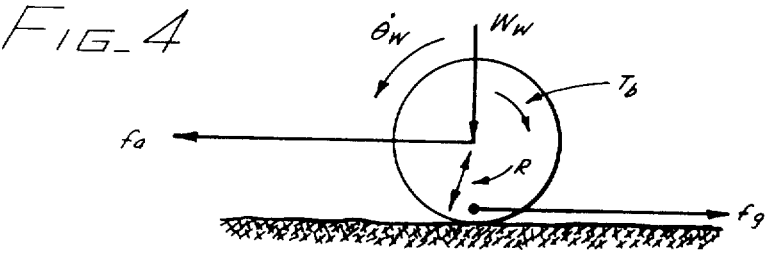

FIG-4

FREE BODY DIAGRAM OF WHEEL ASSEMBLY ON RUNWAY $W_w$ = WEIGHT ON WHEELS
$J_w$ = POLAR MOMENT OF INERTIA OF WHEEL TIRE ASSEMBLY
$T_b$ = BRAKE TORQUE
$f_g$ = GROUND FORCE ON TIRE
$f_a$ = HORIZONTAL AXLE FORCE
$R$ = TIRE ROLLING RADIUS
$\theta_w$ = WHEEL ANGLE OF ROTATION
$\sigma$ = TIRE SLIP ON RUNWAY (SEE DEFINITION ABOVE)
$\mu_g$ = TIRE COEFFICIENT OF FRICTION

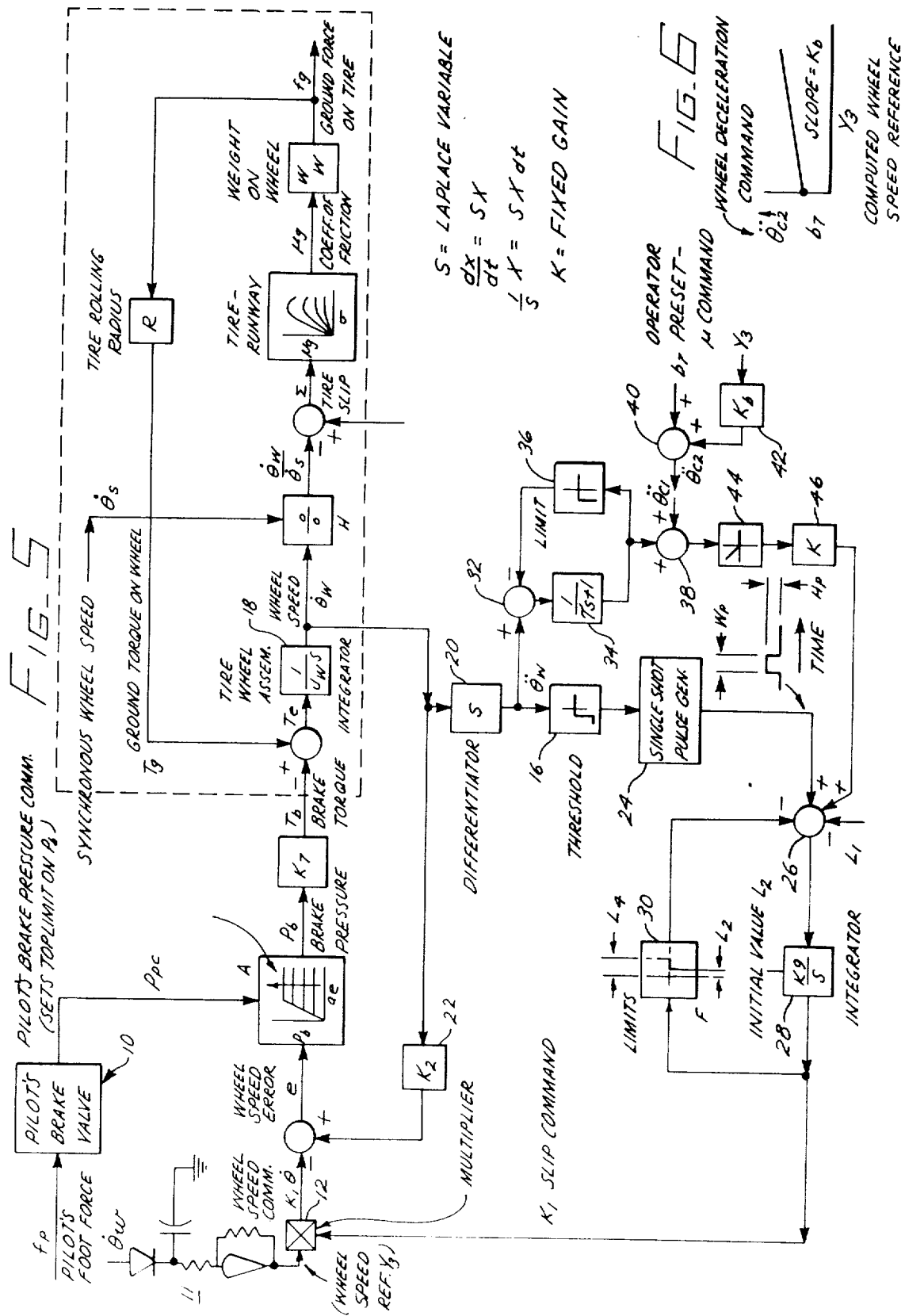

United States Patent Office 3,702,714
Patented Nov. 14, 1972

3,702,714
SLIP COMMAND SKID CONTROL WITH
ACCELERATION OVERRIDE
Orland D. Branson, Sunland, Calif., assignor to
The Bendix Corporation
Filed Apr. 30, 1971, Ser. No. 139,029
Int. Cl. B60t 8/08, 8/10
U.S. Cl. 303—21 P          4 Claims

ABSTRACT OF THE DISCLOSURE

A skid control system is described which modifies an operator's brake pressure request in such manner as to deliver maximum braking effectiveness by continuously searching the roadway surface condition to determine the percentage of tire slip at which maximum braking occurs and to modulate the brake pressure such that the percent tire slip is forced into region resulting in maximum braking. An electrical wheel speed signal is generated in each braked wheel in which frequency varies with speed, and this signal is supplied to constant or "hold and track" circuit means to provide a wheel speed reference. The system will also operate with a single braked wheel. This reference is combined with a slip command signal to produce a wheel speed error signal. A small amount of the integral of this wheel speed error is added to itself, and the sum is supplied to a servo valve which may modify the operator's brake pressure command. When any of the wheels experiences a deceleration greater than a threshold value, indicating the point of maximum braking has been passed, an output pulse is provided which effectively reduces the slip command signal (percent slip) to force the slip back to slightly below the maximum braking point. The percent slip command is slowly increased at a fixed rate until the cycle is repeated, thus continuously locating the point of maximum braking and keeping the system in this region. The deceleration signal is also supplied to a control loop which compares sensed deceleration against a deceleration reference and, if the deceleration exceeds the reference, supplies a signal to modify the slip command signal in the sense of reducing braking force to provide smoother application of the brakes and constant deceleration force on the vehicle and passengers. Alternatively, the reference is varied with vehicle speed and other factors to produce greater braking effectiveness, particularly at high speeds where other factors, such as drag, tend to produce the greater proportion of the deceleration.

CROSS-REFERENCE TO RELATED APPLICATION

Ser. No. 837,067, filed June 27, 1969, now Pat. No. 3,614,173, in the name of Orland D. Branson and entitled "Slip Command Skid Control."

BACKGROUND OF THE INVENTION

There have been many systems proposed and built for the purpose of controlling the effects of skidding when brakes are applied to vehicles. Probably the most complex of these systems are for aircraft where the system must deal with a wide range of weights, speeds and runway conditions and where failure or malfunction may result in more serious problems than for ground vehicles, in general. In addition to requiring a high degree of reliability and braking efficiency, an aircraft skid control system is preferably as small and lightweight as possible consistent with the desired performance.

The performance requirements of skid control systems for recent large transport aircraft have been increased such that recent designs bear little resemblance to systems in common use a decade ago. Response times must be faster, wheel speed signals of higher resolution must be provided, and generally more sophisticated principles of operation have been developed. Since the skid control must, in a sense, compute a desired brake actuation, it has been necessary to re-evaluate these computations and arrive at new kinds of computations for controlling brake pressure. Older type controls have generally operated to sense a skid in terms of a wheel deceleration exceeding a predetermined value and then have acted to relieve brake pressure, subsequently scheduling increasing brake pressure according to some predetermined pattern. This approach, in and of itself, has proved inadequate in that there are so many variables that it is almost impossible to get such a control to operate well under all conditions. Some newer designs have incorporated means to calculate instantaneous wheel slip directly with wheel slip ($\sigma$) being defined as follows:

$$\sigma = \frac{\theta_s - \theta_w}{\theta_s} \tag{1}$$

where $\theta_w$ = instantaneous wheel speed, and
$\theta_s$ = synchronous or free running wheel speed.

A relationship which has been of great interest to skid control designers is that shown in FIG. 1 wherein the coefficient of friction between tire and runway ($\mu_g$) is plotted against tire slip ($\sigma$) expressed as a percentage where 100% represents a locked wheel. It will be observed that this relationship typically defines a family of curves having peaks at different values of $\mu_g$ but occurring at about the same range of slip. This has led some designers to attempt to control by computing the slope of the characteristic shown in FIG. 1 and responding to a computed negative slope by reducing brake pressure. Such systems tend to be quite complex as to mechanization because of the number and kind of input signals required for the computation, but they do potentially deal with the many aircraft and runway variables more adequately than earlier types.

In the Branson application, Ser. No. 837,067, referred to above, a system has been described which causes the braking system to deliver very high braking efficiency by performing the following two functions:

(1) It continuously searches the runways to determine at what percent wheel slip the instantaneous maximum coefficient of friction, $\mu_g$, occurs and creates a corresponding percent wheel slip command.

(2) This wheel slip command forces the percent slip to the region containing this maximum $\mu_g$ and thus creates nearly maximum braking effectiveness.

Equation 1 above is equivalent to:

$$\sigma = 1 - \theta_w/\theta_s \tag{2}$$

Thus, by controlling $\theta_w/\theta_s$, wheel slip may be controlled. FIG. 2 shows a simplified feedback control loop which will drive the loop error toward zero. From this loop the following relationship will become apparent:

$$\epsilon_e = K_1 \theta_s - K_2 \theta_w \tag{3}$$

where $\epsilon_e$ = loop error
$K_1$ = a gain, and
$K_2$ = another gain.

When $\epsilon_e$ is zero, Equation 3 may be expressed as:

$$\frac{\theta_w}{\theta_s} = \frac{K_1}{K_2} \tag{4}$$

and substituting Equation 4 into Equation 2 gives $$\sigma = 1 - \frac{K_1}{K_2}$$

Thus a fixed value of $K_1$ and $K_2$ will cause the control system to create a fixed wheel slip irrespective of synchronous wheel speed provided the error, $\epsilon_e$, is kept near zero.

If the gain $K_1$ is varied and $K_2$ is held constant, the slip, $\sigma$, will vary accordingly. This gain $K_1$, then, becomes a slip command to the system. FIG. 3 shows the relationship of $K_1$ to the resulting slip $\sigma$.

FIG. 4 shows a free body diagram of the wheel assembly on the runway together with a legend identifying the various factors acting thereon.

In the embodiment referred to above, the synchronous wheel speed is not actually used, since it has been determined that a satisfactory wheel speed reference can be generated from the braked wheels. In this system, a combination of signals from individual wheel speed signal generators is used to generate a wheel speed reference for all of the wheel circuits on the same side of the aircraft or vehicle. By including a significant storage capability for the wheel speed signal, the stored signal (which approximately represents the highest wheel speed a short time previously) is effectively used as the wheel speed reference. The synchronous, or free-rolling, speed signal is not needed. The skid control system in effect searches the runway and locates the peak of the $\mu_g - \sigma$ curve, in relation to whatever wheel speed reference is used. If the reference differs from true synchronous wheel speed, the resulting slip differs correspondingly from true slip, but the skid control system is not affected in any way. It will command a slip based on this reference; however, the true slip resulting at the wheel will be the correct slip corresponding to the peak of the $\mu_g - \sigma$ curve. For this reason, the computed wheel speed reference $y_3$ in FIG. 5 can be greatly in error from true synchronous speed without affecting the skid control system.

DESCRIPTION OF THE DRAWINGS

FIG. 1 is a graph in which typical values of tire-surface or runway coefficient of friction ($\mu_g$) are plotted against percentage tire slip ($\sigma$).

FIG. 2 is a block diagram of a simplified skid control loop.

FIG. 3 is a graph showing the relationship between slip command ($K_1$) and percentage slip ($\sigma$) for a constant value of a gain $K_2$.

FIG. 4 shows a free body diagram of the wheel assembly on the runway together with a legend identifying the various factors acting thereon.

FIG. 5 is a block diagram of a skid control according to my invention.

FIG. 6 is a graph showing a desired characteristic for a deceleration command signal.

SUMMARY OF THE INVENTION

The system thus far described, although very effective and efficient, produces cycling effects which may at times be a cause of some discomfort to the occupants of the associated aircraft or vehicle. Where optimum braking effectiveness is less important than passenger comfort, it may be desirable to further limit the braking action in accordance with a variable which will tend to reduce or eliminate the cycling action. One way of doing this is to control to an acceleration (or deceleration) reference. These terms effectively mean the same thing except for sign and will be used interchangeably herein. By using either a uniform acceleration voltage reference or a reference which is varied to compensate for speed-related conditions such as drag and lift, the braking action will, in many cases, be prevented from reaching the peaks of the curves of FIG. 1. Where the coefficient of friction $\mu_g$ is low, as in icy or wet runways, the acceleration reference may not come into play, and the control will operate as a pure "slip command" system. Where the coefficient of friction is high, it may be desirable to limit to a maximum deceleration to avoid the effects of sharply applying and releasing the brakes which may cause some passenger discomfort.

Applicant has determined that by using the same wheel acceleration signal developed for the slip command signal and comparing this with a desired acceleration reference, an acceleration error signal is produced which, if it is of such polarity as to indicate an excessive acceleration (deceleration), may be summed with the other inputs to summer 26 to effectively drive the slip command signal to a value calling for lower braking effectiveness.

A constant deceleration reference, while providing smooth braking action, may result in braking effectiveness below that required, particularly for high aircraft landing speeds during which most of the deceleration within the reference value occurs as a result of drag. This leaves little deceleration within the reference value for the brakes to accomplish. Because of this disadvantage, it may be preferred to use a modified reference which allows greater braking effectiveness while the aircraft is at high speed and reducing the braking effectiveness progressively as the aircraft slows. This reference may vary linearly with aircraft speed, or with the computed wheel speed, or special applications may make it desirable to introduce certain non-linearities, such as when flaps or spoilers are operated, to provide effective braking which is still smooth in application and which does not cycle over the peaks of the $\mu - \sigma$ curves.

DESCRIPTION OF THE PREFERRED EMBODIMENT

A block diagram shown in FIG. 5 shows a simplified slip command system such as that described in the copending Branson application referred to above, but including the additional acceleration limit circuits described above for providing smooth braking action. In this block diagram the portion of FIG. 5 shown in dotted outline actually is concerned with runway and tire conditions and the manner in which these factors affect the control system.

It will be recognized that the output of box H, $\theta_\omega/\theta_s$ is an integral part of Equation 1 referred to previously and is added in opposition to the factor 1 to produce the tire slip $\sigma$. From Equation 1

$$\sigma = 1 - \frac{\theta_\omega}{\theta_s}$$

This division operation is inherent in the operation of the braked wheel, tire and runway, and this, along with the coefficient of friction $\mu_g$ and the weight on the wheel $W_w$, produces a certain ground force on the tire, $f_g$. This ground force, acting through the rolling radius, is fed back as a ground torque $T_g$ acting in opposition to the brake torque $T_b$.

The wheel speed error can result in brake pressure only to the limit of that commanded by the pilot exerting force on a brake valve 10. This brake presure is summed in box A with a wheel speed error signal $e$ to provide a brake pressure $P_b$ which is supplied through a gain element $K_7$ to provide the desired brake torque $T_b$. The wheel speed reference $\theta_\omega$ is supplied to a "track and hold" circuit 11 which provides a relatively long time constant in the direction of decreasing wheel speed and esesntially no time constant in the increasing direction. The resistance and capacitance values chosen would normally be such as to provide a time constant of about one second. This wheel speed reference signal $y_3$ is supplied to a multiplier element 12 which multiplies the wheel speed reference with the slip command signal $K_1$ (described below) to provide a wheel speed command signal fed to a summer 14. The summer 14 combines this wheel speed command signal with a feedback signal representative of actual instantaneous wheel speed to provide a wheel speed error signal that is supplied to box A.

Referring to box A, at zero brake pressure command the wheel speed $\theta_\omega$ will be equal to the synchronous wheel speed $\theta_s$. In the initial application of brake pressure, the loop error is positive and greater than that required to reach the peak of the $\mu_g\theta$ curve of FIG. 1. When the pilot's brake pressure command reaches a value sufficient to cause the slip $\sigma$ to reach the peak of the $\mu_g\theta$ curve, the wheel-tire-runway loop passes into its unstable positive feedack condition (this is the closed subloop from $T_b$ to $F_g$ shown in FIG. 5), resulting in a very high wheel deceleration which exceeds the threshold in box 16. To arrive at this deceleration signal, the wheel speed signal $\theta_\omega$ coming from the tire wheel assembly, box 18, is supplied to the differentiator 20 as well as to the gain unit 22 and from thence to summer 14. The output of box 20 is, of course, the differentiated wheel speed signal and represents wheel deceleration, and when this signal exceeds the threshold in box 16 an output signal is supplied to the single shot pulse generator 24 which is then caused to produce a single pulse of constant height and duration for each time the wheel deceleration exceeds the threshold level. The pulse output from generator 24 is supplied to a summer 26 which receives a number of input signals, one of which is a constant voltage reference signal $L_1$. The sum of these pulses and other input signals to summer 26 are integrated in an integrator 28 to produce a slip command $K_1$. Each pulse produces a fixed incremental change in the slip command, and each increment reduces the slip command sufficiently (see FIG. 3) to drive the system from right to left over the peak of the respective curve in FIG. 1.

After the pulse, the fixed input $L_1$ will reduce the value of $K_1$ at a fixed rate, thus slowly driving the slip $\sigma$ to higher values, causing the cycle to repeat itself. The net effect is to force the tire to cycle back and forth in the region of the peak in the $\mu_g - \sigma$ curve, regardless of the horizontal and vertical location of this peak. The only requirement for this cycling action is that the pilot must command at least sufficient brake pressure to reach the peak of the $\mu_g - \sigma$ curve of the particular runway condition existing at the moment. A portion of the output of integrator 28 is fed back to the summer 26 through a limit circuit 30 which operates to keep the slip command signal $K_1$ within certain desired minimum and maximum limits ($L_2$, $L_4$). Thus the output of the integrator 28, which is the slip command signal $K_1$, is supplied to the multiplier 12 where it is multiplied with the wheel speed reference, as described.

The deceleration signal from the differentiator 20 is also supplied to a summer 32 and to a time constant circuit 34 which supplies a relatively large first order time lag. This average wheel deceleration signal which is the output of block 34 is subject to a limit controlled by means in a block 36 which is fed back to summer 32. Thus very high deceleration signals which may occur over a relatively short period are prevented from effecting the slip command signal. The deceleration signal, as limited, is supplied to an additional summer 38 where it is compared with an acceleration command $\theta_c$.

As indicated above, the fixed command $\theta_{c1}$ for the deceleration signal will supply a smooth deceleration force on the airplane or vehicle but will be relatively inefficient so far as braking effectiveness is concerned in the initial or high-speed stages of a landing. For this reason, a variable command $\theta_{c2}$ has been supplied as an alternative which may be viewed as a mu command signal. Thus the pilot or operator supplies a preset mu command at a fixed level $b_7$. (See FIG. 6.) This signal is then summed in a summer 40 with an additional signal responsive to the wheel speed reference $y_3$ to produce the relationship $\theta_{c2} = b_7 + K_b y_3$. The factor $K_b$ is a single gain in box 42. The reference $\theta_{c2}$ therefore constitutes a fixed preset value plus a fixed slope varying with the computed wheel speed reference $y_3$ and is fed to summer 38 as an alternate to $\theta_{c1}$. There are a number of speed variable factors which enter into the computation of the actual mu experienced in the course of a landing of an aircraft on a runway, some of which are drag, lift, etc. For the design with which the applicant was concerned, these could be collectively dealt with with sufficient accuracy by means of the linear slope $K_b$. In other applications, it might be necessary to provide a nonlinear relationship between $\theta_{c2}$ and $y_3$. Thus it will be appreciated that applicant has described a single system which can vary considerably in its operation, depending upon which of the two command signals $\theta_{c1}$ or $\theta_{c2}$ are used in the acceleration portion of the system. If the fixed acceleration command is used, the braking will be smooth but less effective, particularly at the high speed end of the landing. To improve this effectiveness, the mu command approach involving the nonlinear command signal may be used.

The acceleration error signal which results from the summing action at summer 38 is supplied to a circuit 44 which blocks all positive-going output signals of summer 38 and provides one-to-one transmittal of the negative output to a fixed gain element 46. The output of element 46 is summed in summer 26 along with the output from the pulse generator 24, the fixed reference $L_1$, and the feedback from the limit circuit 30. Thus the deceleration error signal operates to modify the slip command signal if the wheel deceleration is higher than that commanded. It modifies the slip command signal by preventing it from commanding any greater value of slip. If the wheel deceleration is lower than that commanded, the slip command will not be affected in any way, but the wheel deceleration will be driven higher by the normal action of the slip command system. Increasing slip command creates increasing wheel deceleration.

FIG. 5 is a simplified schematic which shows the essentials of applicant's invention but does not include a number of refinements appearing in the application Ser. No. 837,067 referred to above. Many of these refinements are in the nature of auxiliary feedback loops which may or may not be required, depending upon particular applications. It is believed that those skilled in the art will recognize the applicability or non-applicability of individual feedback loops as applied to their particular installation.

I claim:

1. A system for controlling skidding of a braked wheel comprising operator-operated means for producing a commanded brake pressure, means producing a first electrical signal varying with instantaneous angular velocity of said wheel, means converting said first signal to a second signal varying with rate of change of angular velocity of said wheel, a pulse generator responsive to values of said second signal above a threshold value to produce an output pulse, a constant voltage and summing means in which said output pulse is added to said constant voltage, means integrating the output signal from said summing means, means including a time constant circuit responsive to said first signal for producing a wheel speed reference signal, a multiplier multiplying said integrated output signal with said wheel speed reference signal to produce a wheel speed command signal, means comparing said wheel speed command signal with said first electrical signal to produce a wheel speed error signal, control means responsive to said wheel speed error signal for modifying said operator commanded brake pressure, a second time constant circuit responsive to said second signal for producing a signal corresponding to an average of the instantaneous wheel deceleration, a deceleration reference signal and a summer in which said reference signal and said average deceleration signal are compared to produce a deceleration error signal, and means connecting said error signal to said first named summer in such sense that said error signal tends to oppose said constant voltage.

2. A system for controlling skidding of a braked wheel as set forth in claim 1 wherein said deceleration reference is variable with changes in said wheel speed reference signal.

3. A system for controlling skidding of a braked wheel as set forth in claim 2 wherein said deceleration reference is linearly variable with said wheel speed reference signal.

4. A system for controlling skidding of a braked wheel as set forth in claim 1 wherein the output of said second time constant circuit is supplied to a limiter and the output signal from said limiter is connected in opposition to the input signal to said second time constant circuit.

References Cited

UNITED STATES PATENTS 3,069,313   9/1971   Lucien         303—21 BE X
3,614,173  10/1971   Branson       303—21 P MILTON BUCHLER, Primary Examiner S. C. KUNIN, Assistant Examiner U.S. Cl. X.R.

303—20